(12) United States Patent
Dross

(10) Patent No.: US 9,333,904 B2
(45) Date of Patent: May 10, 2016

(54) CONTROLLABLE HIGH LUMINANCE ILLUMINATION WITH MOVING LIGHT-SOURCES

(71) Applicant: KONINKLIJKE PHILIPS N.V., Eindhoven (NL)

(72) Inventor: Oliver Dross, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/383,648

(22) PCT Filed: Feb. 26, 2013

(86) PCT No.: PCT/IB2013/051540
§ 371 (c)(1),
(2) Date: Sep. 8, 2014

(87) PCT Pub. No.: WO2013/132386
PCT Pub. Date: Sep. 12, 2013

(65) Prior Publication Data
US 2015/0022085 A1    Jan. 22, 2015

Related U.S. Application Data

(60) Provisional application No. 61/608,186, filed on Mar. 8, 2012.

(51) Int. Cl.
*B60Q 1/14* (2006.01)
*B60Q 1/16* (2006.01)
(Continued)

(52) U.S. Cl.
CPC ............. *B60Q 1/1415* (2013.01); *B60Q 1/16* (2013.01); *F21S 48/115* (2013.01);
(Continued)

(58) Field of Classification Search
CPC ............. B60Q 1/04; B60Q 1/10; B60Q 1/12; F21S 48/1154; F21S 48/1159; F21S 48/1742
USPC ............................. 315/77, 78, 79, 80, 82, 83; 362/512–514, 469
See application file for complete search history.

(56) References Cited

U.S. PATENT DOCUMENTS 6,899,435 B2    5/2005  Yamanaka
7,014,336 B1 *  3/2006  Ducharme et al. ............ 362/231
(Continued)

FOREIGN PATENT DOCUMENTS

EP    1508740 A1    2/2005
WO    9815942 A1    4/1998
(Continued)

*Primary Examiner* — Minh D A
*Assistant Examiner* — Borna Alaeddini

(57) ABSTRACT

The present invention relates to an illumination device (1) for providing a controllable illumination configuration. The illumination device comprises a light-source unit (2; 20) comprising a plurality of individually controllable solid state light-sources (8); and an optical element (3) arranged to modulate light from the solid state light-sources through a modulation area (16) of the optical element (3). The illumination device (1) further comprises an actuator (4) connected to the light-source unit (2) and controllable to move the light-source unit relative to the optical element (3) in such a way that the solid state light-sources (8) pass the modulation area (16) of the optical element (3) in succession; and a control unit (5) configured to control each of the solid state light-sources (8) to emit light with a time-varying intensity corresponding to the illumination configuration while the solid state light-source (8) moves past the modulation area of the optical element.

17 Claims, 3 Drawing Sheets

(51) Int. Cl.
*B60Q 1/04* (2006.01)
*F21S 8/10* (2006.01)
*B60Q 1/12* (2006.01)
*B60Q 1/10* (2006.01)
*F21Y 101/02* (2006.01)
*F21Y 105/00* (2016.01)

(52) U.S. Cl.
CPC ........ *F21S 48/1742* (2013.01); *F21S 48/1747* (2013.01); *F21S 48/325* (2013.01); *F21S 48/34* (2013.01); *B60Q 1/04* (2013.01); *B60Q 1/10* (2013.01); *B60Q 1/12* (2013.01); *F21S 48/1154* (2013.01); *F21S 48/1159* (2013.01); *F21Y 2101/02* (2013.01); *F21Y 2105/00* (2013.01)

(56) References Cited

U.S. PATENT DOCUMENTS

| | | | |
|---|---|---|---|
| 7,021,795 B2 * | 4/2006 | Coates | H04N 9/315 348/E9.027 |
| 7,128,423 B2 * | 10/2006 | Imade | F21S 6/003 353/94 |
| 7,429,918 B2 * | 9/2008 | Watanabe | B60Q 1/085 340/468 |
| 7,753,554 B2 * | 7/2010 | Tanaka | G03B 21/2013 362/249.02 |
| 2003/0076057 A1 | 4/2003 | Fleury | |
| 2004/0125601 A1 * | 7/2004 | Coates et al. | 362/284 |
| 2005/0128441 A1 | 6/2005 | Morgan | |
| 2006/0175623 A1 | 8/2006 | Kimura | |
| 2007/0019408 A1 | 1/2007 | McGuire et al. | |
| 2007/0052938 A1 * | 3/2007 | Lerner | G03B 21/00 353/122 |
| 2007/0109501 A1 * | 5/2007 | Imade | G03B 21/208 353/31 |
| 2009/0034284 A1 | 2/2009 | Li et al. | |
| 2009/0046474 A1 * | 2/2009 | Sato | F21S 48/1159 362/466 |
| 2009/0187234 A1 | 7/2009 | Meyer et al. | |
| 2009/0284148 A1 | 11/2009 | Iwanaga | |
| 2010/0039622 A1 | 2/2010 | Wang | |
| 2013/0038736 A1 * | 2/2013 | Yamamura | F21S 48/1159 348/148 |

FOREIGN PATENT DOCUMENTS

| | | |
|---|---|---|
| WO | 03063477 A1 | 7/2003 |
| WO | 2010133090 A1 | 11/2010 |
| WO | 2010140112 A1 | 12/2010 |
| WO | 2011060619 A1 | 5/2011 |
| WO | 2011129105 A1 | 10/2011 |

* cited by examiner

— · — City Light
·········· Motorway Light
— ·· — Country Light
········ Junction Light

US 9,333,904 B2

CONTROLLABLE HIGH LUMINANCE ILLUMINATION WITH MOVING LIGHT-SOURCES

CROSS-REFERENCE TO PRIOR APPLICATIONS

This application is the U.S. National Phase application under 35 U.S.C. §371 of International Application No. PCT/IB13/051540, filed on Feb. 26, 2013, which claims the benefit of U.S. Provisional Patent Application No. 61/608,186, filed on Mar. 8, 2012. These applications are hereby incorporated by reference herein.

FIELD OF THE INVENTION

The present invention relates to a device and method for providing a controllable illumination configuration.

BACKGROUND OF THE INVENTION

As the performance of solid state light-sources, such as light-emitting diodes (LEDs) is rapidly improving, while prices are dropping, new applications for solid state light-sources are emerging. For some applications, where the maximum luminance is a key feature, LEDs, however, have not yet been widely adopted. Due to thermal management issues and the so-called droop, the loss of efficiency at excessive drive current densities, currently available LEDs still cannot meet the requirements on high luminance over time for, for example, automotive headlamp applications without rather complex and costly thermal management arrangements, such as large cooling fins and/or fans. The same is valid for other applications, such as for spotlights etc.

In addition, for automotive headlamps as well as for spotlights etc, it would be desirable to be able to control and change the illumination pattern electronically. For example, in the case of an automotive headlamp, it would be desirable to be able to control the illumination configuration depending on the driving conditions. Systems to achieve this, often referred to as Advanced Frontlighting Systems (AFS), exist. For instance, LED-based AFS-headlamps have been proposed, which are realized using an array of addressable LEDs, so-called pixel light.

Such an arrangement is, for example, disclosed by U.S. Pat. No. 7,429,918, where a number of LEDs are each arranged on a separate substrate, and each substrate can be individually controlled to a selected inclination angle. Hereby, various illumination configurations can be achieved, but with a complex arrangement having many moving parts that have to be individually controlled. Furthermore, heat management issues still remain to be addressed.

SUMMARY OF THE INVENTION

In view of the above-mentioned and other drawbacks of the prior art, a general object of the present invention is to provide an improved illumination device, in particular providing for a high luminance as well as facilitating control of the illumination configuration/pattern provided by the illumination device.

According to a first aspect of the present invention there is provided an illumination device for providing a controllable illumination configuration, the illumination device comprising: a light-source unit comprising a plurality of individually controllable solid state light-sources; an optical element arranged to modulate light from the solid state light-sources through a modulation area of the optical element; an actuator connected to the light-source unit and controllable to move the light-source unit relative to the optical element in such a way that the solid state light-sources pass the modulation area of the optical element in succession; and a control unit configured to control each of the solid state light-sources to emit light with a time-varying intensity corresponding to the illumination configuration while the solid state light-source moves past the modulation area of the optical element.

Solid state light-sources are light-sources in which light is generated through recombination of electrons and holes. Examples of solid state light-sources include LEDs and semiconductor lasers.

The present invention is based on a number of realizations. Firstly, the present inventor has realized that a considerably higher luminance can be provided by a solid-state light-source, such as an LED, when driving it for a short period of time than when driving it for a prolonged period of time, and that this higher luminance can be provided over time by arranging a plurality of solid state light-sources on a movable carrier. By moving the light-source unit (comprising the carrier and the solid state light-sources), sufficiently fast, the impression of continuously emitted high luminance illumination can be provided. Secondly, the present inventor has realized that a moving light-source unit also greatly facilitates the cooling of the light-sources. The movement creates an airflow over the light-sources, which considerably improves the removal of heat from the light-sources. Thirdly, the present inventor has realized that different illumination configurations/patterns, can conveniently be provided by controlling the drive current or other suitable drive parameter of the light-sources as they move past the optical element. In this way, complex illumination configurations can be achieved through intensity modulation only, which does not require any additional hardware or moving parts. For example, a longer on-time results in a wider beam, and by varying the intensity during the time when each light-source passes the modulation area of the optical element, for example, an asymmetric beam can be achieved. The latter is particularly useful for automotive applications, where it may be desirable to have a higher intensity/illuminance on the side of the road where the car is driving than on the opposite side.

According to various embodiments of the present invention, the control unit may comprise an input for receiving a control signal indicative of a desired illumination configuration; processing circuitry configured to determine a sequence of drive parameter values corresponding to the desired illumination configuration; and an output for providing the sequence of drive parameter values to each of the solid state light-sources depending on a position of the solid state light-source in relation to the modulation area of the optical element.

The "sequence" of drive parameters may be a series of discrete parameter values or may be a substantially continuous function of the position of the solid state light-source.

By providing drive parameter values, such as drive current levels, that depend on the position of the solid state light-source relative to the modulation area of the optical element, an illumination configuration/pattern with a desired intensity variation, at least in the dimension defined by the movement of the light-sources, can conveniently be provided. Furthermore, the illumination configuration can easily be modified, simply by providing a different sequence of drive parameter values.

Furthermore, the plurality of individually controllable solid state light-sources comprised in the light-source unit may advantageously comprise a first set of solid state light-sources each following a first trajectory when moving past the modulation area of the optical element; and a second set of solid state light-sources, each following a second trajectory different from the first trajectory when moving past the modulation area of the optical element.

By individually controlling the solid state light-sources in the first set and in the second set, the illumination pattern/configuration can be controlled also in a second dimension perpendicular to the dimension defined by the movement of the light-sources.

The number of solid state light-sources in the first set and in the second set may be the same, whereby complex illumination patterns may be provided, or there may be considerably fewer, such as less than half the number of solid state light-sources in the second set, whereby a favorable tradeoff is achieved between the ability to achieve different illumination configurations and the number of solid state light-sources.

The light-source unit may, in principle, move relative to the optical element in any way, such as linearly or along a curved path. To facilitate the practical realization of the illumination device, it may, however be advantageous to arrange the light-source unit to be rotated by the actuator about a rotational axis.

According to one embodiment, the rotational axis may be substantially parallel with an optical axis of the optical element. In this embodiment, the light-source unit may, for example, comprise a disc-shaped carrier on which the solid state light-sources are mounted.

According to another embodiment, the rotational axis may be substantially perpendicular to an optical axis of the optical element. In this embodiment, the light-source unit may, for example, comprise a wheel-shaped carrier and a plurality of solid state light-sources mounted on a peripheral surface of the carrier.

The embodiment with the rotational axis substantially parallel with the optical axis of the optical element may result in a more cost-efficient configuration of the light-source unit, while on the other hand, at least for some applications, requiring a more complicated configuration of the optical element. Accordingly, the above-mentioned embodiments may be preferable for different applications.

In either of the above-mentioned embodiments, and other embodiments in which the light-source unit is arranged to be rotated by the actuator, the light-sources may advantageously be arranged in a spiraling configuration, which may be a convenient way of achieving a desired illumination pattern, in combination with the above-mentioned time-varying control of the light-sources as they move past the modulation area of the optical element.

According to various embodiments, moreover, the illumination device according to the present invention may advantageously further comprise a fan arrangement being drivable by the actuator to provide an air flow in a direction substantially parallel with an illumination direction of the illumination device. This is particularly useful in outdoor applications where fog or ice may accumulate on a transparent housing or similar. In particular for automotive headlamp applications, there may otherwise be problems with fog or ice forming on the protective transparent cover. In conventional headlamps, the heat that is radiated by the light-source will take care of the defogging/deicing, but when solid state light-sources are used, the emitted light has a much narrower spectrum and hardly carries any heat (IR radiation). By providing a fan arrangement to be driven by the actuator, and configuring the fan arrangement such that the heat generated by the solid state light-sources is directed in the forwards direction, defogging/deicing can be handled in a convenient manner.

The fan arrangement may advantageously be integrated in the light-source unit, which means that no additional moving components are required to achieve simultaneous cooling of the solid state light-sources and defogging/deicing of the transparent window through with the light is emitted.

According to various embodiments of the present invention, the output comprised in the control unit may advantageously be a wireless output, such as bluetooth or similar, for wirelessly providing the sequence of drive parameters to the solid state light-sources.

Moreover, the illumination device according to various embodiments of the present invention may advantageously be comprised in an automotive headlamp arrangement, wherein the illumination device is configured to provide a substantially horizontally extending illumination configuration when mounted in a vehicle.

According to a second aspect of the present invention, there is provided a method of providing a controlled illumination configuration, comprising the steps of: providing a light-source unit comprising a plurality of individually controllable solid state light sources; moving the light-source unit relative to an optical element in such a way that the solid state light-sources pass a modulation area of the optical element in succession; and controlling each of the solid state light-sources to emit light with a time-varying intensity corresponding to the illumination configuration while the solid state light-source moves past the focal area of the optical element.

According to various embodiments, the step of controlling may comprise the steps of: acquiring a control signal indicative of a desired illumination configuration; determining a sequence of drive parameter values corresponding to the desired illumination configuration; and providing the sequence of drive parameter values to each of the light-sources depending on a position of the light-source in relation to the modulation area of the optical element.

Further variations and advantages of this second aspect of the present invention are largely analogous to those provided above in connection with the first aspect of the invention.

BRIEF DESCRIPTION OF THE DRAWINGS

These and other aspects of the present invention will now be described in more detail, with reference to the appended drawings showing currently preferred embodiments of the invention, wherein.

DESCRIPTION OF A PREFERRED EMBODIMENT OF THE PRESENT INVENTION

In the following description, the present invention is mainly described with reference to an automotive headlamp application with a light-source unit that is arranged to be rotated about a rotational axis.

It should, however, be noted that this by no means limits the scope of the invention, which is equally applicable to other applications, such as floodlight applications, as well as to other configurations. An example of a further configuration is that the light-source unit may be arranged to be moved along a linear path past the optical element.

Figure 1:
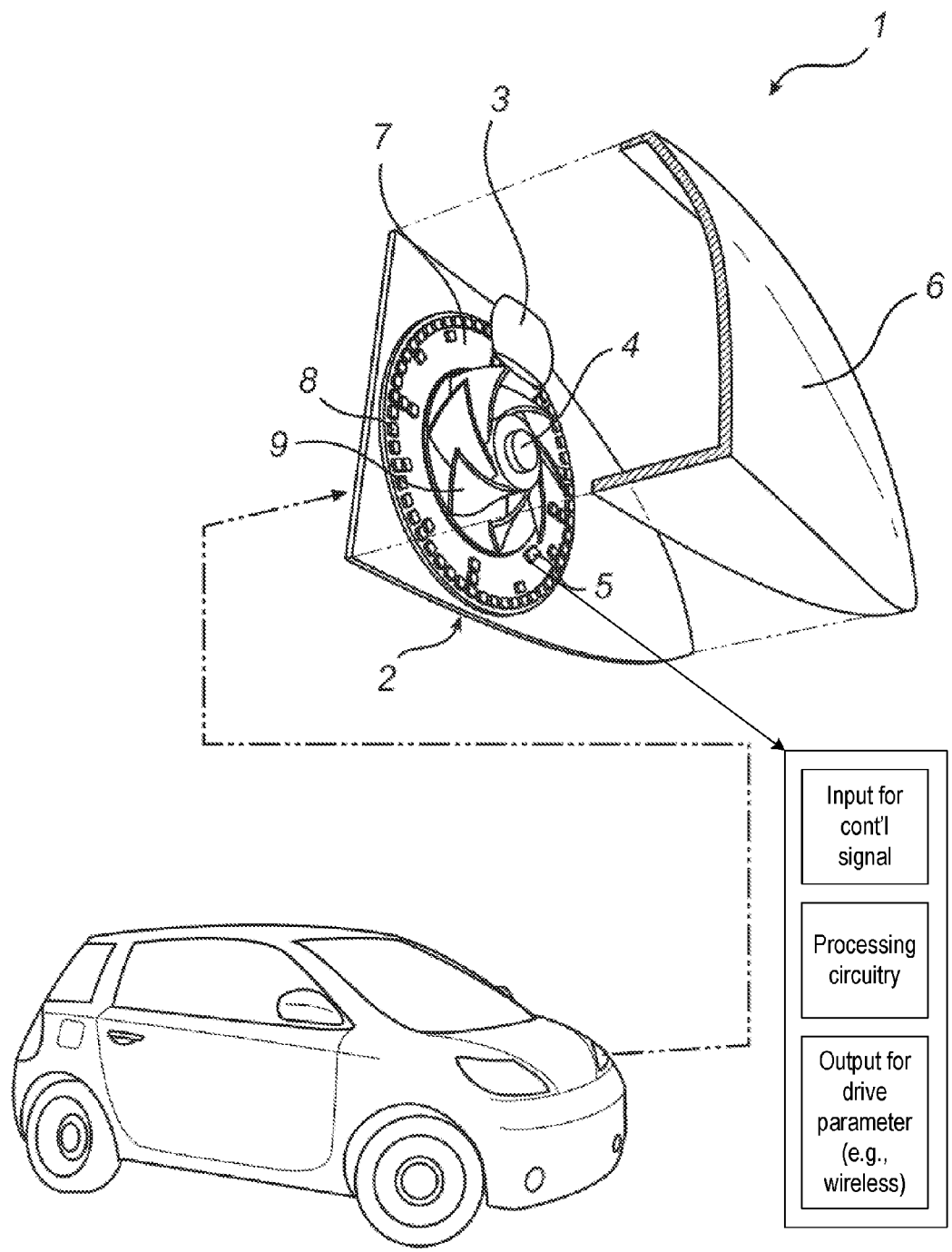
FIG. 1 is a perspective view of an automotive headlamp comprising an illumination device according to a first exemplary embodiment of the present invention.

FIG. 1 schematically illustrates an exemplary application for embodiments of the illumination device according to the present invention, in the form of an automotive headlamp 1 comprising a light-source unit 2, projection optics, here shown as a simple lens 3, an actuator in the form of an electric motor 4, a control unit 5 for controlling operation of the automotive headlamp 1, and a transparent protective cover 6. As is schematically illustrated in FIG. 1, the light-source unit 2 comprises a disc 7, on which a plurality of individually controllable LEDs 8 are arranged, as well as blades forming a fan 9.

The electric motor 4 is connected to the light-source unit 2 and is controllable to rotate the light-source unit 2 (the disc 7 and the fan 9). When the electric motor 4 rotates the light-source unit 2, the LEDs 8 will pass the lens 3 in succession and light emitted by the LEDs 8 and modified by the lens 3 will be projected through the transparent protective cover 6 to illuminate the scene in front of the automotive headlamp 1. Although here being schematically shown as a simple lens 3, it should be understood that the projection optics can be any type of imaging optics, including single or multiple lens collimators, reflectors and other imaging optics that capture a larger numerical aperture of the LED light, for example the so-called RXI optic.

While the LEDs 8 move past the lens 3, each LED 8 is provided with a time-varying current through the control unit 5, which results in a time-varying intensity being provided by each LED 8 as it passes the modulation area of the lens 3. In the presently illustrated example, the control unit is arranged on the spinning disc 7. The power for all LEDs 8 and the control unit 5 can be provided by means of sweep arms (not shown in FIG. 1). One contact can for some motors be provided through the motor shaft. In this case one single power line is sufficient, that can, for example, be accomplished through a sweep arm and ring or by inductive coupling from a non rotating coil to a rotating coil. The data or signal for the control unit 5 can, for example, be provided through one or more sweep arms, or via an IR or Bluetooth link.

The light pattern provided by the automotive headlamp 1 will be determined by the properties of the lens 3 as well as of the respective radial positions of the LEDs 8 and the time-varying intensity being provided by each LED 8 as it passes the lens 3. Hereby, different light patterns can be provided by controlling the time-varying current that is provided to the LEDs 8. In addition, the LEDs 8 will be cooled by the rotation of the substrate quite efficiently, which makes heavy heat sinks unnecessary. Additionally, as is schematically indicated in FIG. 1, the light-source unit may comprise a fan 9, and since the airflow created by this fan is directed towards the transparent protective cover 6, it will contribute to reduce the occurrence of fog or ice on the transparent protective cover 6. This is in contrast to stationary LED arrangements, that in almost all cases transfer the heat produced by the LEDs to the back of the LED array, towards the hot motor compartment, that provides almost no cooling capabilities.

Due to the configuration with LEDs 8 being controlled to emit light as they pass the lens 3, the automotive headlamp 1 will in effect provide light in the form of short rapidly moving flashes. As is well known to those skilled in the art, the frequency to avoid the visibility of such flashes or strobo-scopic effects should preferably be above e.g. 400 Hz. This frequency will translate to a minimum rotational speed of the disc 7 for a given angular spacing of the LEDs 8, or, conversely, a minimum angular spacing of the LEDs 8 for a given rotational speed of the disc 7. Such conditions will be straight-forward for the skilled person to determine.

For an automotive headlamp 1 such as that in FIG. 1, it is desirable to achieve a generally horizontal illumination pattern. To that end, the lens 3 should be configured to project the curved trajectory followed by the LEDs 8 as the disc 7 rotates to such a generally horizontal illumination pattern. This is in general not possible with a simple rotationally symmetric lens. However this can be achieved with several rotational lenses or with a single refractive lens with one or two correctly formed free form surfaces. Calculation methods for determining such free form surfaces are well known, one being the so-called SMS 3D method.

Using the automotive headlamp 1 in FIG. 1, different illumination configurations/patterns can be provided for different driving situations. How this can be achieved will now be described with reference to FIGS. 2a-b.

Figure 2A:
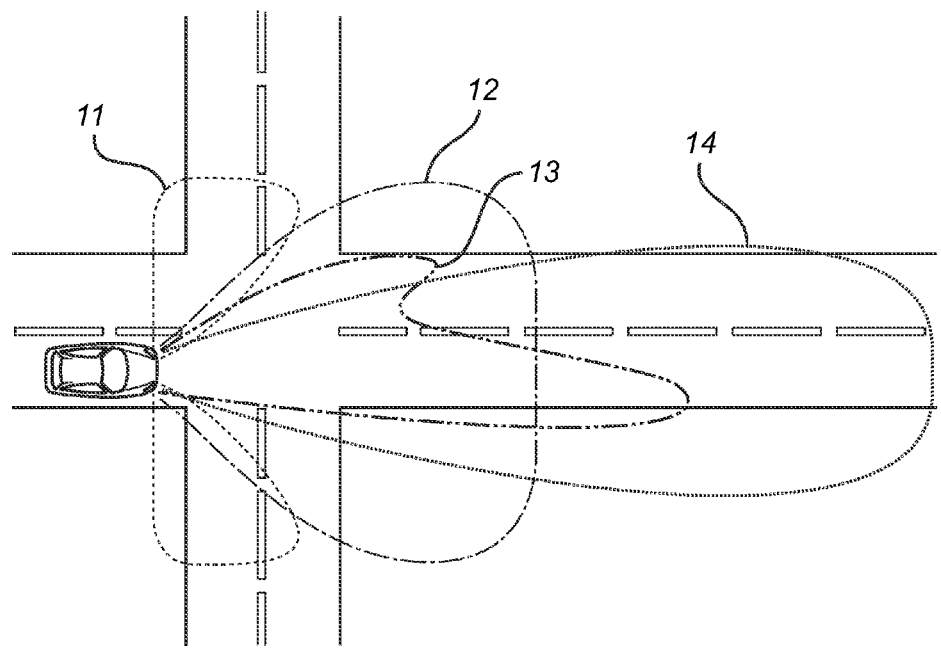
FIG. 2a schematically shows different illumination configurations for different driving situations.

FIG. 2a schematically shows some examples of different illumination configurations for different driving situations. Referring to FIG. 2a, the illumination configurations that are shown are junction light 11, city light 12, country light 13, and motorway light 14.

Figure 2B:
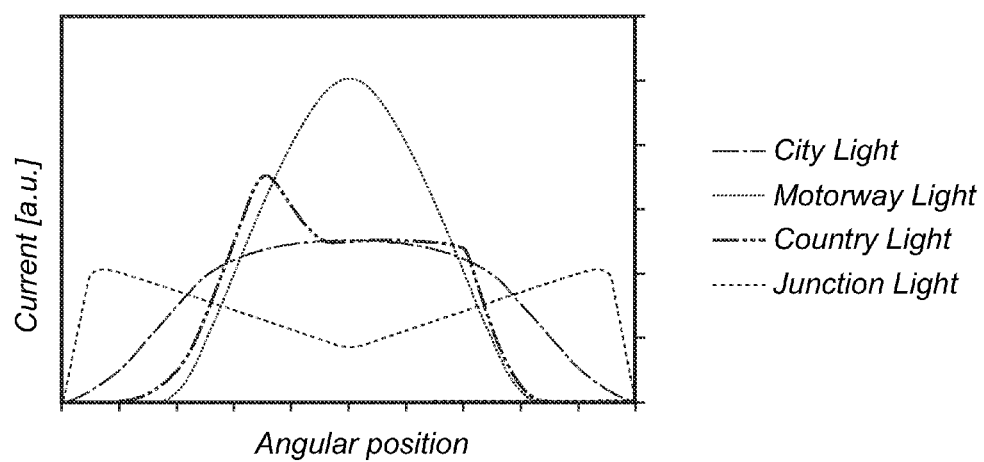
FIG. 2b schematically shows different driving parameters for obtaining the illumination configurations in FIG. 2a using the automotive headlamp in FIG. 1.

These different illumination configurations can be achieved using the exemplary current profiles indicated in the diagram in FIG. 2b, with the different current profiles corresponding to the different illumination configurations in FIG. 2a as is indicated by the legend in FIG. 2b. The x-axis of the diagram in FIG. 2b indicates the angular position of each LED 8 arranged on the disc 7 in FIG. 1 from the LED 8 entering the modulation area of the lens 3 until the LED 8 leaves the modulation area of the lens 3. The y-axis of the diagram in FIG. 2b indicates the time-varying drive current provided to each LED 8 during the time when the LED 8 is swept past the angular position range corresponding to the modulation area of the lens 3. It should be pointed out that the disc 7 in FIG. 1 is rotated clock-wise, as is indicated by the arrow in FIG. 1.

The exact profile of the time-varying current supplied to each LED 8 can be calculated from the transmission characteristics of the lens 3 and the wanted illumination configuration/pattern, or may be determined experimentally. The different profiles (and additional ones, or many interpolated curves to allow smooth transitions between the different beam patterns) may, for example, be loaded into a look up table in the control unit 5 or be provided by a suitable program that processes input from the driver of the vehicle and/or from vehicle sensors.

Figure 3:
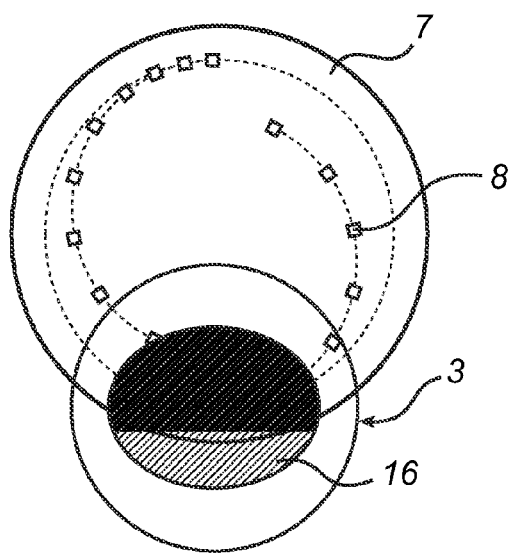
FIG. 3 schematically illustrates an alternative configuration of the light-source unit.
Figure 4:
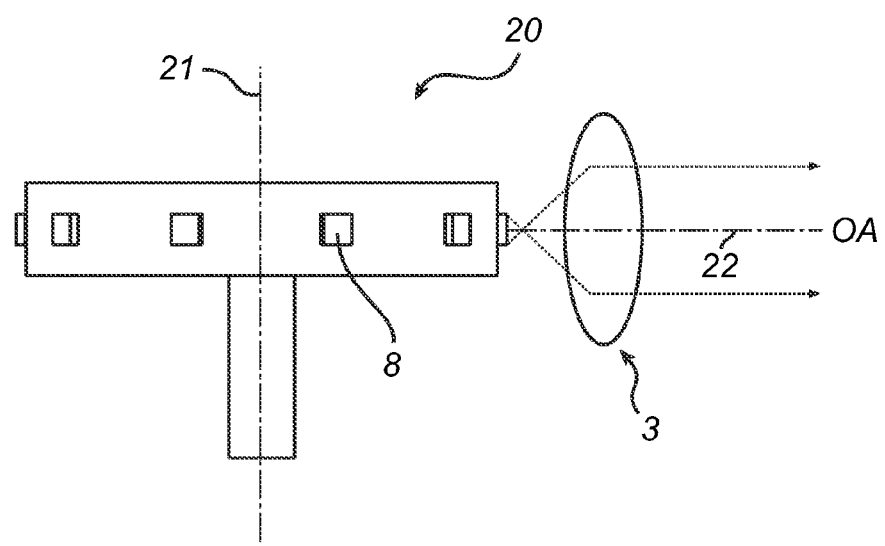
FIG. 4 is a schematic illustration of an illumination device according to a second exemplary embodiment of the present invention.

Alternative light-unit configurations are schematically illustrated in FIGS. 3 and 4.

Referring first to FIG. 3, the LEDs 8 are arranged on the disc 7 along a spiral so that the projections resulting from the LEDs 8 passing the modulation area 16 of the lens 3 overlap in the far field sufficiently to create a smooth vertical light distribution.

As is schematically illustrated in FIG. 4, the LEDs 8 can be mounted on the cylindrical surface of a light-source unit 20 that rotates around a rotational axis 21 that is perpendicular to an optical axis 22 of the lens 3. For an automotive headlamp application such as that in FIG. 1, the light-source unit 20 in FIG. 4 could be combined with a simpler lens than the light-source unit 2 in FIG. 1 because in this configuration the top edge of the LEDs follows a curve on the horizontal plane, that can be quite easily imaged towards the horizon However, the distance between each LED 8 and the lens 3 will vary as the light-source unit 20 rotates. This will lead to some defocus at larger horizontal angles, if not compensated by the optics, which is very well possible.

The thermal behavior of this arrangement is equally advantageous as placing the LEDs on the disc as in FIG. 1. The cylindrical embodiment can, when adding vanes, create and airflow wither parallel to the rotation axis, or radial, in both cases it can be redirected towards the cover glass by elements within the lamp housing to provide the defogging/deicing function.

Additionally, variations to the disclosed embodiments can be understood and effected by the skilled person in practicing the claimed invention, from a study of the drawings, the disclosure, and the appended claims. For example, an impeller type fin configuration can be used to create an airstream silently and possibly more effectively. Furthermore, a second optical system can be mounted at the bottom of the motor with optical surfaces to project the opposite LED edge to the horizon.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An illumination device for providing controllable illumination, said illumination device comprising:
    a light-source unit comprising a plurality of individually controllable solid state light-sources;
    an optical element arranged to modulate light from said solid state light-sources through a modulation area of said optical element;
    an actuator connected to the light-source unit and controllable to move said light-source unit relative to said optical element in such a way that said solid state light-sources pass through said modulation area of the optical element in succession; and
    a control unit configured to drive each of said solid state light-sources with a sequence of drive parameter values corresponding to an illumination configuration from when said solid state light-source enters said modulation area of the optical element until said solid state light-source leaves said modulation area of the optical element so said solid state light-source emits light with a time-varying intensity, said sequence of drive parameter values including at least three different drive parameter values.

2. The illumination device according to claim 1, wherein said control unit comprises:
    an input for receiving a control signal indicative of said illumination configuration;
    processing circuitry configured to determine said sequence of drive parameter values corresponding to said desired illumination configuration; and
    an output for providing said sequence of drive parameter values to each of said solid state light-sources depending on a position of said solid state light-source in said modulation area of the optical element.

3. The illumination device according to claim 2, wherein said output of the control unit is a wireless output for wirelessly providing said sequence of at least three drive parameter values to said solid state light-sources.

4. The illumination device according to claim 1, wherein said plurality of individually controllable solid state light-sources comprises:
    a first set of solid state light-sources each following a first trajectory when moving past said modulation area of the optical element; and
    a second set of solid state light-sources, each following a second trajectory different from the first trajectory when moving past said modulation area of the optical element.

5. The illumination device according to claim 4, wherein said first set of solid state light-sources comprises a first number of solid state light-sources and said second set of solid state light-sources comprises a second number of solid state light-sources, said first number being greater than said second number.

6. The illumination device according to claim 5, wherein said first number is at least two times said second number.

7. The illumination device according to claim 1, wherein said light-source unit is arranged to be rotated about a rotational axis by said actuator.

8. The illumination device according to claim 7, wherein said rotational axis is substantially parallel with an optical axis of said optical element.

9. The illumination device according to claim 7, wherein said rotational axis is substantially perpendicular to an optical axis of said optical element.

10. The illumination device according to claim 7, wherein said solid state light-sources are arranged in a spiraling configuration.

11. The illumination device according to claim 1, further comprising a fan arrangement being drivable by said actuator to provide an air flow in a direction substantially parallel with an illumination direction of said illumination device.

12. The illumination device according to claim 11, wherein said fan arrangement is integrated in said light-source unit.

13. An automotive headlamp arrangement comprising an illumination device according to claim 1, being configured to provide a substantially horizontally extending illumination configuration when mounted in a vehicle.

14. The illumination device of claim 1, wherein said control unit is further configured to drive each of said solid state light-sources with another sequence of drive parameters corresponding to another illumination configuration while said solid state light-source moves through said modulation area of the optical element.

15. A method of providing controlled illumination, comprising the steps of:
    providing a light-source unit comprising a plurality of individually controllable solid state light sources;
    moving said light-source unit relative to an optical element in such a way that said solid state light-sources pass through a modulation area of the optical element in succession; and
    driving each of said solid state light-sources with a sequence of drive parameter values corresponding to an illumination configuration from when said solid state light-source enters said modulation area of the optical element until said solid state light-source leaves said modulation area of the optical element so said solid state light-source emits light with a time varying intensity, said sequence of drive parameter values comprising at least three different drive parameter values.

16. The method according to claim 15, wherein said step of driving comprises the steps of:
    acquiring a control signal indicative of said illumination configuration;
    determining said sequence of drive parameter values corresponding to said illumination configuration; and providing said sequence of drive parameter values to each of said light-sources depending on a position of said light-source in said modulation area of the optical element.

17. The method of claim 15, further comprising driving each of said solid state light-sources with another sequence of drive parameters corresponding to another illumination configuration while said solid state light-source moves through said modulation area of the optical element.

* * * * *